United States Patent
Bernklau

(10) Patent No.: US 12,203,796 B2
(45) Date of Patent: Jan. 21, 2025

(54) FLUID LEVEL SENSING ARRAYS FOR AIRCRAFT

(71) Applicant: Textron Innovations Inc., Providence, RI (US)

(72) Inventor: Nathaniel Ross Bernklau, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 255 days.

(21) Appl. No.: 17/746,397

(22) Filed: May 17, 2022

(65) Prior Publication Data

US 2023/0375391 A1    Nov. 23, 2023

(51) Int. Cl.
*G01F 23/292*    (2006.01)
(52) U.S. Cl.
CPC .................. *G01F 23/2924* (2013.01)
(58) Field of Classification Search
CPC .................................... G01F 23/2924
See application file for complete search history.

(56) References Cited

U.S. PATENT DOCUMENTS

| | | | | |
|---|---|---|---|---|
| 3,473,021 A | * | 10/1969 | Elliott ................... | G01F 23/288 |
| | | | | 73/290 R |
| 3,727,242 A | * | 4/1973 | Miller ................... | G01F 23/292 |
| | | | | 359/837 |
| 4,286,464 A | * | 9/1981 | Tauber ................ | G01F 23/2924 |
| | | | | 340/619 |
| 5,201,223 A | | 4/1993 | McQueen | |
| 5,534,708 A | * | 7/1996 | Ellinger ............... | G01F 23/2927 |
| | | | | 356/137 |
| 9,541,445 B2 | * | 1/2017 | Tence ................... | G01F 23/2925 |
| 10,655,726 B2 | | 5/2020 | Poster | |

(Continued)

FOREIGN PATENT DOCUMENTS

| CN | 105683723 | * | 6/2016 | | |
|---|---|---|---|---|---|
| EP | 1494074 A1 | * | 1/2005 | ......... | G03F 7/70341 |

(Continued)

OTHER PUBLICATIONS

Flow, Level, Temperature and Pressure Sensors for Aircraft Applications; FCI Aerospace; Jan. 1, 2009.

(Continued)

*Primary Examiner* — Jamel E Williams
*Assistant Examiner* — Alex T Devito
(74) *Attorney, Agent, or Firm* — Lawrence Youst PLLC

(57) ABSTRACT

A fluid level sensing system includes a mounting strip and fluid sensing nodes coupled to the mounting strip. Each fluid sensing node is switchable between a fluid present state and a fluid absent state. Each fluid sensing node includes a prism, a photoemitter and a photoreceptor. The photoemitter and photoreceptor are interposed between the prism and the mounting strip. In the absence of fluid around the prism, the photoreceptor receives greater than a threshold amount of light from the photoemitter internally reflected by the prism to switch the fluid sensing node to the fluid absent state. When the prism is covered in fluid, the photoreceptor receives less than the threshold amount of light from the photoemitter to switch the fluid sensing node to the fluid present state. A processor determines a fluid level based on the fluid detection states of the fluid sensing nodes.

20 Claims, 10 Drawing Sheets

(56) References Cited

U.S. PATENT DOCUMENTS

| | | | |
|---|---|---|---|
| 11,300,199 | B2 | 4/2022 | Poster et al. |
| 2018/0087420 | A1 | 3/2018 | Poster |
| 2020/0182679 | A1 | 6/2020 | Olson |

FOREIGN PATENT DOCUMENTS

| | | | | |
|---|---|---|---|---|
| EP | 3299283 A1 | * | 3/2018 | ............. B64C 27/12 |
| GB | 2002905 | * | 2/1979 | |
| KR | 19990016971 | * | 5/1999 | |

OTHER PUBLICATIONS

Hareendran, T. K.; Optical Liquid Level Sensor; https://www.electroschematics.com/optical-liquid-level-sensor/; Date Unknown.

Infrared Liquid Level Sensor Water Level Detection Alarm Control Modules; https://www.blibli.com/p/infrared-liquid-level-sensor-water-level-detection-alarm-control-modules/ps--HOL-60029-71429; Date Unknown.

Level Control: How do Electro-Optic Point-Level Sensors Work ?; https://www.coleparmer.ca/blog/2014/07/11/level-control-how-do-electro-optic-point-level-sensors-work/; Antylia Scientific Blog; Date Unknown.

Masterflex Electro-Optic Point-Level Sensors; Cole-Parmer; Date Unknown.

Nie, Renhuang, et al.;Optical Liquid-level Sensor Based on a Designed Light Guide Plate; Science Direct; vol. 296; https://www.sciencedirect.com/science/article/abs/pii/S0924424719310465; Sep. 1, 2019.

Optical Hydraulic Level Switch Oil Level Float Switch Sensor; https://m.made-in-china.com/product/Optical-Hydraulic-Level-Switch-Oil-Level-Float-Switch-Sensor-887440105.html; Date Unknown.

Optical Level Gauging System; https://www.tamagawa-seiki.com/products/featured/levelgauge.html; Date Unknown.

Optical Level Sensor Switch; https://www.abestmeter.com/electronic-water-level-switch/; Date Unknown.

* cited by examiner

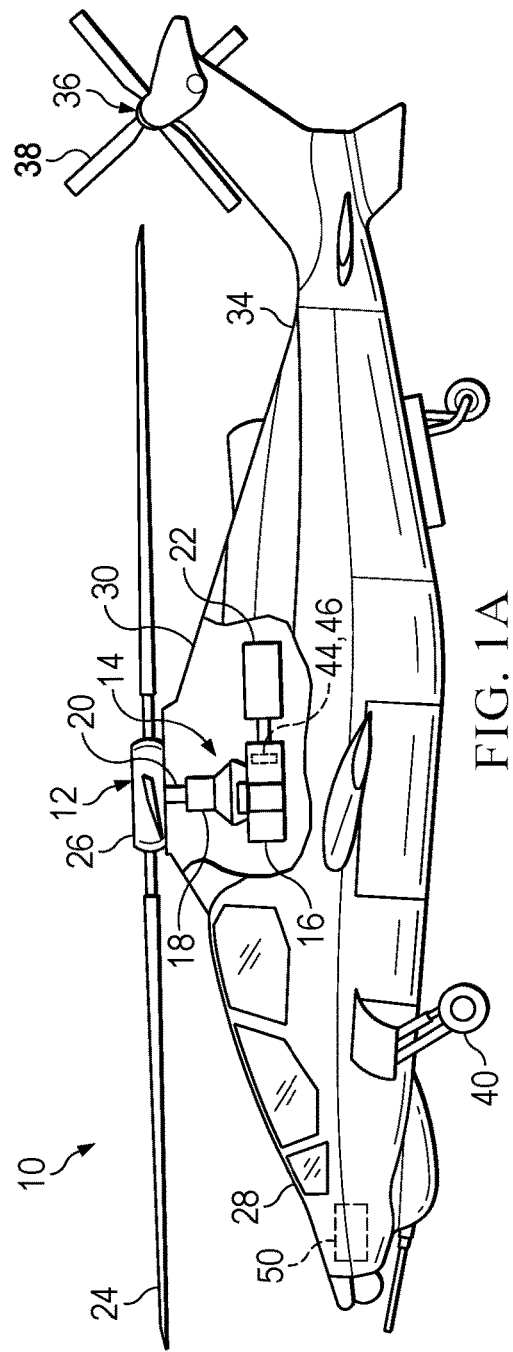
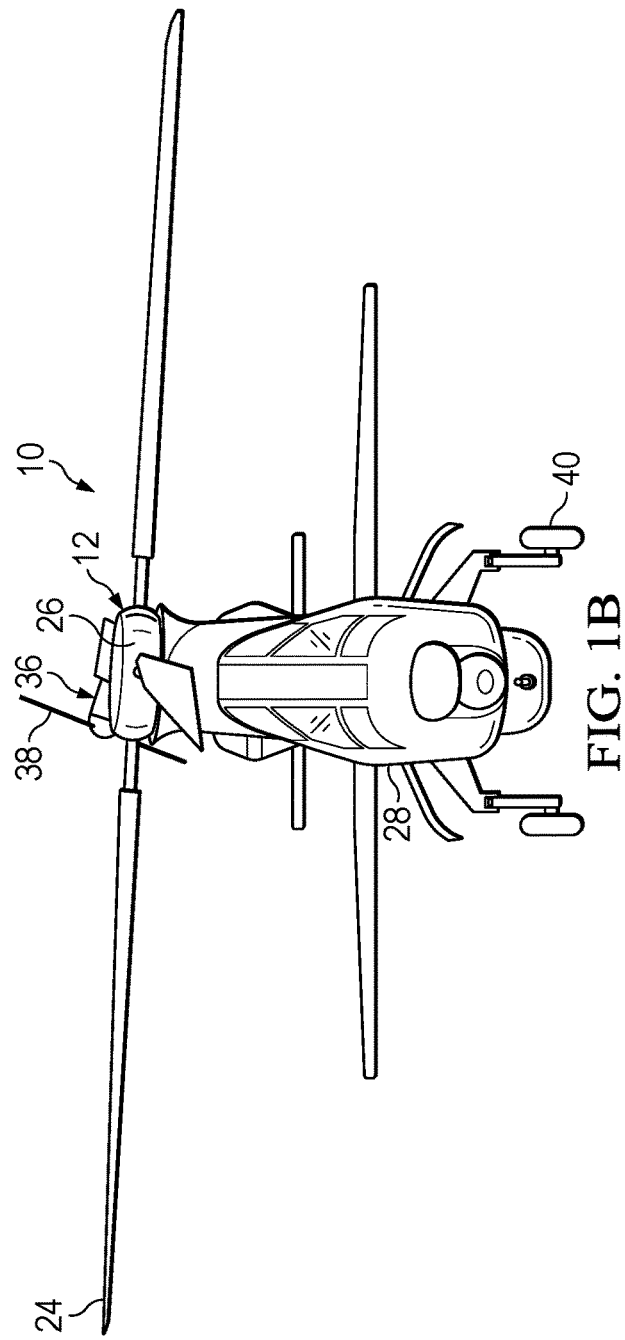
FIG. 1A
FIG. 1B

FLUID LEVEL SENSING ARRAYS FOR AIRCRAFT

TECHNICAL FIELD OF THE DISCLOSURE

The present disclosure relates, in general, to detecting fluid levels in aircraft fluid containers and, in particular, to fluid level sensing arrays having optical fluid sensing nodes that determine the presence of fluid at each node, thereby detecting the fluid level in the fluid container to which the fluid level sensing array is mounted.

BACKGROUND

Vehicles rely on a variety of different fluids during operation, each of which is stored or contained onboard the vehicle. For example, vehicles utilizing an internal combustion engine require fuel stored in a fuel tank. Gearboxes contain lubricating fluid to reduce friction between gears. Electric vehicles may require coolant to manage battery operating temperature. In each of these examples as well as numerous others, the fluid level fluctuates over time due to usage of the fluid, leakage or other reasons. Loss of fluid below safe threshold levels may result in the vehicle being damaged or demobilized, such as when loss of lubricating fluid in a gearbox causes the gears therein to overheat.

Due to the importance of maintaining proper fluid levels, several different types of fluid level sensors have been previously developed. For example, some vehicles employ mechanical devices such as dipsticks or float gauges to determine fluid level. Mechanical gauges, however, often require manual intervention to determine fluid level, fail to provide operator feedback in real time and may be too heavy or spatially obtrusive for certain applications such as aerospace applications. Electrical fluid level sensors use the resistive properties of a fluid to detect voltage resistance, which is then used to determine fluid level. For example, automotive oil level sensors may include an outer case housing a core element and measure the capacitance or resistance between these two elements to determine oil level. Electrical fluid level sensors often require tedious and time-consuming calibration prior to or during installation as well as precise advanced knowledge of the desired fluid level for a particular fluid container. Because electrical fluid level sensors require a high level of customization to the particular fluid and fluid container to which they are applied, electrical fluid level sensors are not well suited for universal application to various different fluid containers or for dynamic oil level sensing in flight operations. Electrical fluid level sensors also require custom machined housings and hard mounting points, thus preventing adjustment of the desired fluid level of the fluid container after installation and calibration. Current optical fluid level sensors suffer from many of the same drawbacks as electrical fluid level sensors such as machined hard mounting points. In addition, multiple optical fluid level sensors, each requiring machined mounting, must often be installed on a fluid container to monitor fluid levels. Generally speaking, current fluid level sensors also have limited fluid detection ranges and lack the scalability and modularity for convenient universal use. Accordingly, a need has arisen for scalable, modular and reliable fluid level sensors with wide, convenient and cost-effective applicability that overcome the aforementioned drawbacks of prior fluid level sensors.

SUMMARY

In a first aspect, the present disclosure is directed to a fluid level sensing system including a mounting strip and fluid sensing nodes coupled to the mounting strip in a collinear arrangement. Each fluid sensing node is switchable between at least two fluid detection states including a fluid present state and a fluid absent state. Each fluid sensing node includes a prism, a photoemitter interposed between the prism and the mounting strip and a photoreceptor interposed between the prism and the mounting strip. The photoemitter emits light into the prism. In the absence of fluid around the prism, the photoreceptor receives greater than a threshold amount of light from the photoemitter internally reflected by the prism to switch the fluid sensing node to the fluid absent state. When the prism is covered in fluid, the photoreceptor receives less than the threshold amount of light from the photoemitter to switch the fluid sensing node to the fluid present state. The fluid level sensing system also includes a processor to determine a fluid level based on the fluid detection states of the fluid sensing nodes.

In some embodiments, the mounting strip may include one or more guard rails to protect the fluid sensing nodes. In certain embodiments, the mounting strip may be severed at a customizable length adapted for a fluid container. In some embodiments, the mounting strip may form an internal cavity and the fluid level sensing system may include one or more wires in the internal cavity of the mounting strip electrically interconnecting the fluid sensing nodes. In certain embodiments, the fluid sensing nodes may be uniformly spaced along the mounting strip. In some embodiments, the processor may determine the fluid level based on the fluid detection states and the positions of the fluid sensing nodes along the mounting strip. In certain embodiments, each prism may be a polymeric prism. In some embodiments, the photoemitter and the photoreceptor may be adjacent the mounting strip-facing side of the respective prism. In certain embodiments, each photoemitter may include one or more light emitting diodes. In some embodiments, the photoemitters of the fluid sensing nodes may be wired in series. In certain embodiments, for each of the fluid sensing nodes the photoreceptor may receive zero light from the photoemitter when the prism is covered in fluid to switch the fluid sensing node to the fluid present state. In some embodiments, the fluid level may be proportional to the number of fluid sensing nodes in the fluid present state. In certain embodiments, the fluid level sensing system may include a notification module to send fluid level data related to the fluid level. In some embodiments, the notification module may send an alert in response to the fluid level being less than a safe fluid level threshold.

In a second aspect, the present disclosure is directed to an aircraft including a fuselage, a fluid container configured to hold a fluid and a fluid level sensing array. The fluid level sensing array includes a mounting strip coupled to an inner surface of the side wall of the fluid container and fluid sensing nodes coupled to the mounting strip in a collinear arrangement. Each fluid sensing node is switchable between at least two fluid detection states including a fluid present state and a fluid absent state. Each fluid sensing node includes a prism, a photoemitter interposed between the prism and the mounting strip and a photoreceptor interposed between the prism and the mounting strip. The photoemitter emits light into the prism. In the absence of fluid around the prism, the photoreceptor receives greater than a threshold amount of light from the photoemitter internally reflected by the prism to switch the fluid sensing node to the fluid absent state. When the prism is covered in fluid, the photoreceptor receives less than the threshold amount of light from the photoemitter to switch the fluid sensing node to the fluid present state. The aircraft also includes a processor to determine a fluid level of the fluid container based on the fluid detection states of the fluid sensing nodes.

In some embodiments, the fluid container may be a gearbox housing for a gearbox and the fluid may be a lubricating fluid. In such embodiments, the gearbox may be a main rotor gearbox disposed in the fuselage. In certain embodiments, the fluid container may be a fuel tank and the fluid may be fuel. In some embodiments, the fluid level sensing array may be a plurality of fluid level sensing arrays coupled to one or more side walls of the fluid container and the processor may determine a fluid level plane of the fluid in the fluid container based on the fluid detection states of the fluid sensing nodes of the plurality of fluid level sensing arrays. In certain embodiments, each fluid level sensing array may occupy a position within the fluid container and the fluid sensing nodes may each have a position along a respective mounting strip. In such embodiments, the processor may determine the fluid level plane based on the fluid detection states of the fluid sensing nodes of the plurality of fluid level sensing arrays, the positions of the fluid level sensing arrays and the positions of the fluid sensing nodes.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 1A-1C are schematic illustrations of a rotorcraft implementing a fluid level sensing system for a main rotor gearbox in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1C:
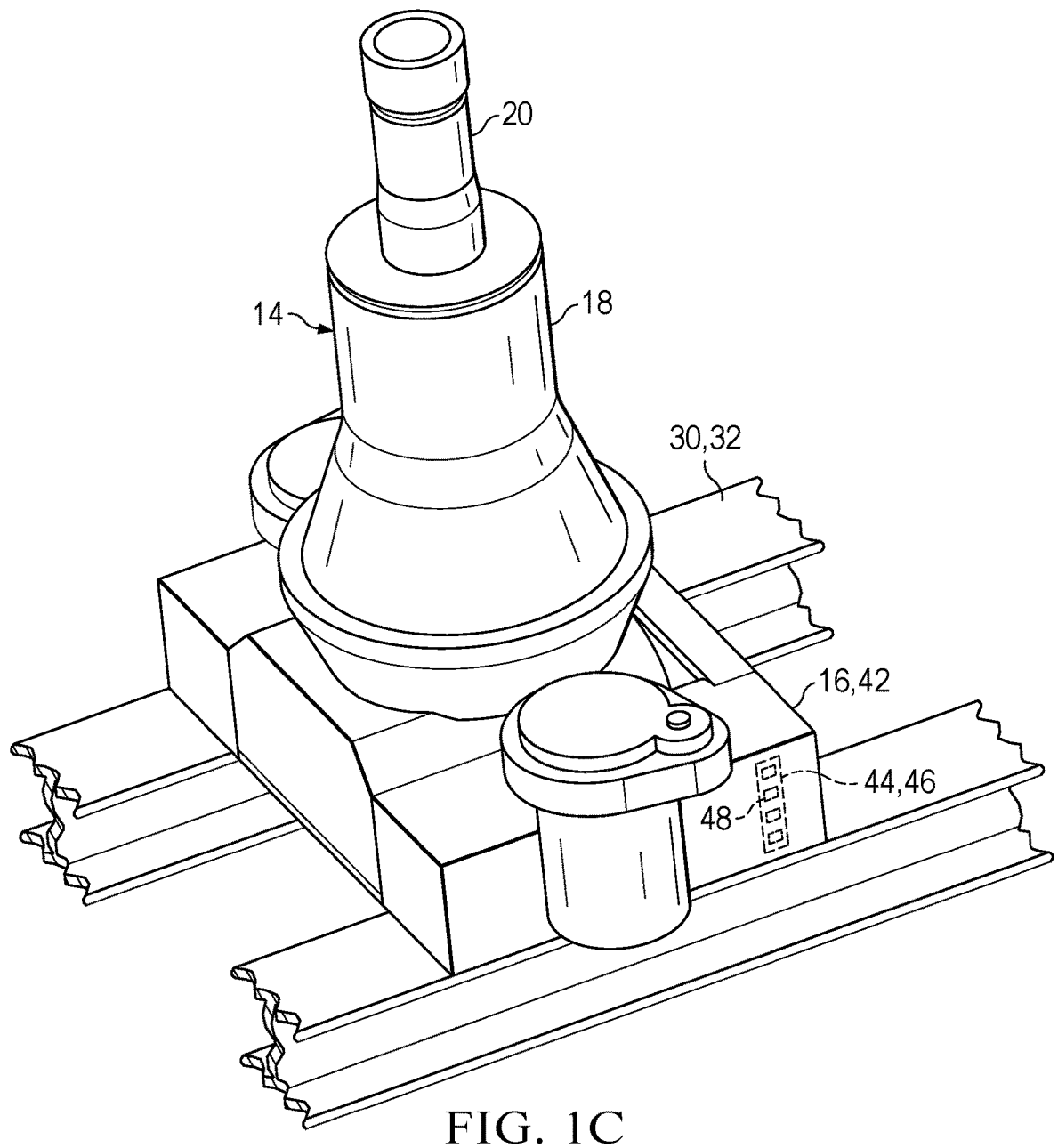

Referring to FIGS. 1A-1C in the drawings, a rotorcraft depicted as a helicopter is schematically illustrated and generally designated 10. The primary propulsion assembly of rotorcraft 10 is a main rotor assembly 12, which includes a pylon assembly 14 having a transmission depicted as main rotor gearbox 16 and a top case 18 supporting a mast 20. Main rotor assembly 12 is powered by one or more engines 22 via main rotor gearbox 16. Main rotor assembly 12 includes a plurality of rotor blade assemblies 24 extending radially outward from a main rotor hub 26. Main rotor assembly 12 is coupled to a fuselage 28 supported by a fuselage airframe 30 including fore-aft beams 32. Fore-aft beams 32 may be overhead beams at or near the top side of fuselage 28 used to support pylon assembly 14. Main rotor hub 26 is rotatable relative to fuselage 28. The pitch of rotor blade assemblies 24 can be collectively and/or cyclically manipulated to selectively control direction, thrust and lift of rotorcraft 10. A tailboom 34 extends from fuselage 28 in the aft direction. An anti-torque system 36 includes a tail rotor 38 that is rotatably coupled to the aft portion of tailboom 34. Anti-torque system 36 controls the yaw of rotorcraft 10. A landing gear system 40 provides ground support for rotorcraft 10.

Main rotor gearbox housing 42 for main rotor gearbox 16 holds a lubricating fluid such as oil or synthetic lubrication to reduce friction between the moving gears therein. The amount of lubricating fluid in main rotor gearbox 16 can decrease over time for several reasons. For example, lubricating fluid can leak out through the seals or other components of main rotor gearbox housing 42, and such leakage may be accelerated by damage to or debris in the seals. In more extreme cases, the lubricating fluid in main rotor gearbox 16 can rapidly decrease in the event of a broken fluid line or pump malfunction. In military combat operational scenarios, for example, enemy fire may sever a fluid line that causes main rotor gearbox 16 to rapidly lose lubricating fluid. Low levels of lubricating fluid in main rotor gearbox 16 leads to increased friction between the moving gears therein, which can cause damage to main rotor gearbox 16 and/or result in the malfunctioning of rotorcraft 10. Low fluid levels in other systems of rotorcraft 10, such as low fuel levels, also interfere with the proper operation of rotorcraft 10.

Several different types of fluid level sensors have been previously developed to monitor fluid levels. For example, some aircraft employ mechanical devices such as dipsticks or float gauges to determine fluid level. Mechanical gauges, however, may require manual intervention, fail to provide operator feedback in real time and may be too heavy or spatially obtrusive for use in aircraft. Electrical fluid level sensors utilize the resistive properties of a fluid such as oil to detect voltage resistance, which is then used to determine fluid level. For example, some oil level sensors include an outer case housing a core element, with the capacitance or resistance measured therebetween to determine oil level. Electrical fluid level sensors often require tedious and time-consuming calibration prior to or during installation as well as precise advanced knowledge of the desired fluid level for a particular fluid container. Because electrical fluid level sensors require a high level of customization to the particular fluid and fluid container to which they are applied, electrical fluid level sensors are not well suited for wide application to different aircraft or fluid containers or for dynamic oil level sensing in flight operations. Electrical fluid level sensors also require custom machined housings and hard mounting points, which further limit their versatility by, for example, rendering it more difficult to adjust the desired fluid level of the fluid container after installation and calibration. Current optical fluid level sensors suffer from many of the same drawbacks as electrical fluid level sensors such as machined hard mounting points. In addition, multiple optical fluid level sensors, each requiring machined mounting, must often be installed on a fluid container to monitor fluid level. Current fluid level sensors also have limited fluid detection ranges and lack the scalability and modularity for convenient universal use on different aircraft types. One specific drawback of current fluid level sensors is that a physical distance must be known at which to place and calibrate the sensor(s). For example, a machined boss at a certain height must be predetermined to receive an optical or capacitance sensor, and each sensor requires a specific datum from which to reference.

To address the various drawbacks of previous fluid level sensors, rotorcraft 10 has a fluid level sensing system including a fluid level sensing array 44 that monitors the fluid level in main rotor gearbox 16 using the optical properties of the lubricating fluid therein. Fluid level sensing array 44 includes a mounting strip 46 coupled to the inner surface of one of the side walls of main rotor gearbox housing 42. Fluid sensing nodes 48 are coupled to mounting strip 46, each switchable between one of two binary states, namely a fluid present state and a fluid absent state, depending on whether each individual fluid sensing node 48 is covered in lubricating fluid. The fluid level sensing system includes a processor, which may be located in a flight control computer 50 or elsewhere, to determine the level of lubricating fluid in main rotor gearbox 16 based on the fluid detection states of fluid sensing nodes 48.

It should be appreciated that rotorcraft 10 is merely illustrative of a variety of aircraft that can implement the embodiments disclosed herein. Indeed, the fluid level sensing systems of the illustrative embodiments may be implemented on any fluid container of any aircraft. Other aircraft implementations can include hybrid aircraft, tiltwing aircraft, tiltrotor aircraft, quad tiltrotor aircraft, unmanned aircraft, gyrocopters, propeller-driven airplanes, compound helicopters, jets, drones and the like. As such, those skilled in the art will recognize that the fluid level sensing systems of the illustrative embodiments can be integrated into a variety of aircraft configurations. The fluid level sensing systems disclosed herein may also be used to measure fluid level in gearboxes other than main rotor gearboxes such as gearboxes in the nacelles or rotor assemblies of tiltrotor or tiltwing aircraft. It should be appreciated that even though aircraft are particularly well-suited to implement the embodiments of the present disclosure, non-aircraft vehicles and devices can also implement the embodiments, and as such the fluid level sensing systems of the illustrative embodiments can be used to monitor fluid levels for any fluid container. For example, the fluid level sensing systems of the illustrative embodiments may be used to measure the fluid levels of ground-based fluid storage tanks.

Figure 2:
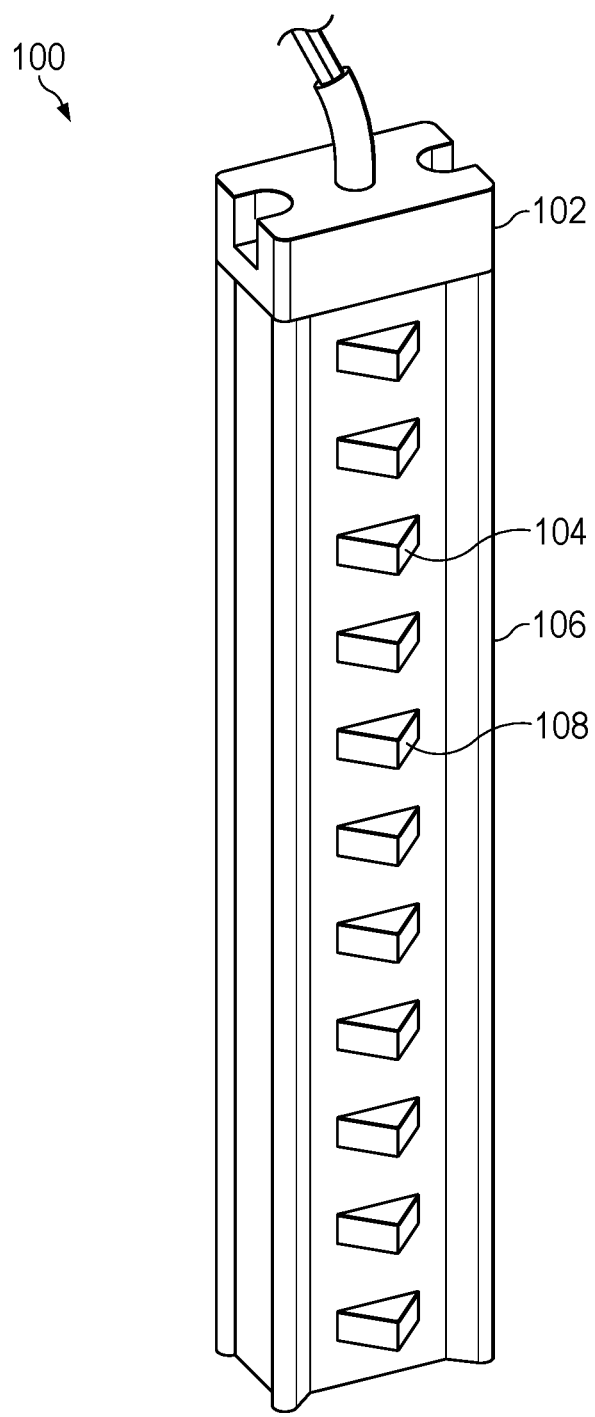
FIG. 2 is an isometric view of a fluid level sensing array in accordance with embodiments of the present disclosure.

Referring to FIG. 2 in the drawings, a fluid level sensing array is schematically illustrated and generally designated 100. Fluid level sensing array 100 is a non-limiting example of fluid level sensing array 44 in FIGS. 1A-1C. Fluid level sensing array 100 includes mounting strip 102, to which fluid sensing nodes 104 are coupled in a collinear arrangement. While mounting strip 102 is depicted as an elongated strip, mounting strip 102 may have any shape and form, for example, a mounting plate having one of numerous shapes or dimensions. Mounting strip 102 may be formed from any material capable of rigidly supporting fluid sensing nodes 104. For example, mounting strip 102 may be an extruded aluminum body. Mounting strip 102 may be mounted to the inner side wall surface of a fluid container in numerous ways such as by forming bosses in the casting of mounting strip 102, sliding mounting strip 102 along a set of guide rails in the fluid container, snapping mounting strip 102 into place on complementary shaped parts in the side wall or using fasteners. Mounting strip 102 forms guard rails 106 to protect fluid sensing nodes 104 from being physically impacted during operation. Guard rails 106 extend along mounting strip 102 in a longitudinal direction alongside fluid sensing nodes 104.

Fluid sensing nodes 104 are uniformly spaced from one another at known height intervals along mounting strip 102. In other embodiments, fluid sensing nodes 104 may be nonuniformly spaced. The distance between fluid sensing nodes 104 may vary based on cost, manufacturing or size constraints as well as the desired level of precision in determining fluid level. The surface tension of the fluid being detected can also affect the distance between fluid sensing nodes 104 to ensure that each fluid sensing node 104 is uncovered in fluid when switching to a fluid absent state. By way of non-limiting example, the uniform distance between fluid sensing nodes 104 in aerospace applications may be in a range between one-sixteenth of an inch and 2 inches such as one-eighth of an inch or one-fourth of an inch.

Each fluid sensing node 104 includes a prism 108 such as a microprism. Prisms 108 may be formed from any optically transparent material including glass or transparent plastics or polymers such as acrylic. Prisms 108 may have any height including heights in a range between one-sixteenth of an inch and 2 inches such as one-fourth of an inch. Also, each side of prisms 108 may have a length in a range between one-sixteenth of an inch and 2 inches such as one-fourth of an inch. While the illustrated embodiment depicts each fluid sensing node 104 as including a respective prism, in other embodiments a single continuous and elongated prism covering all fluid sensing nodes 104 may be coupled to mounting strip 102 such that each fluid sensing node 104 includes a portion of the single continuous and elongated prism.

Figure 3A:
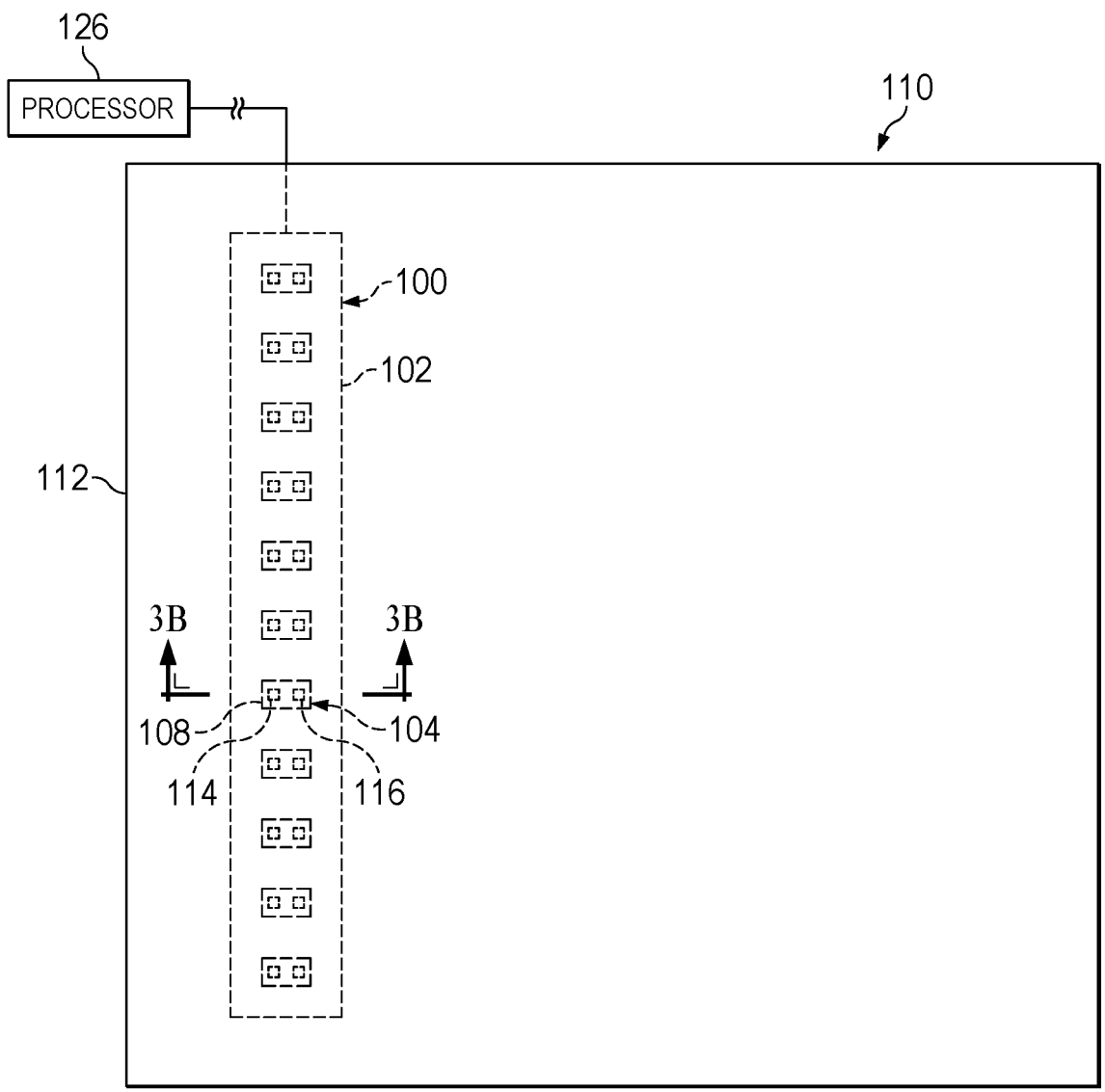
FIGS. 3A-3B are various views of a fluid level sensing system in accordance with embodiments of the present disclosure.
Figure 3B:
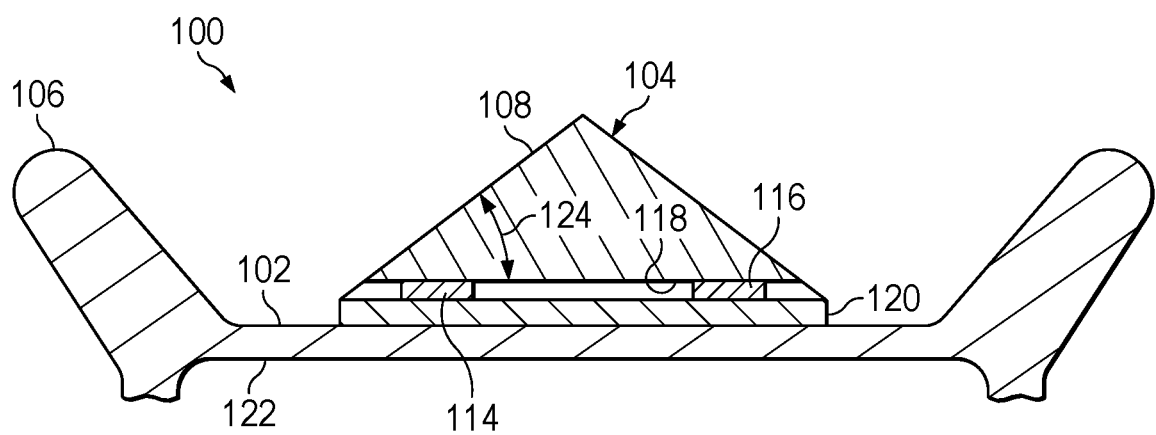
Figure 4A:
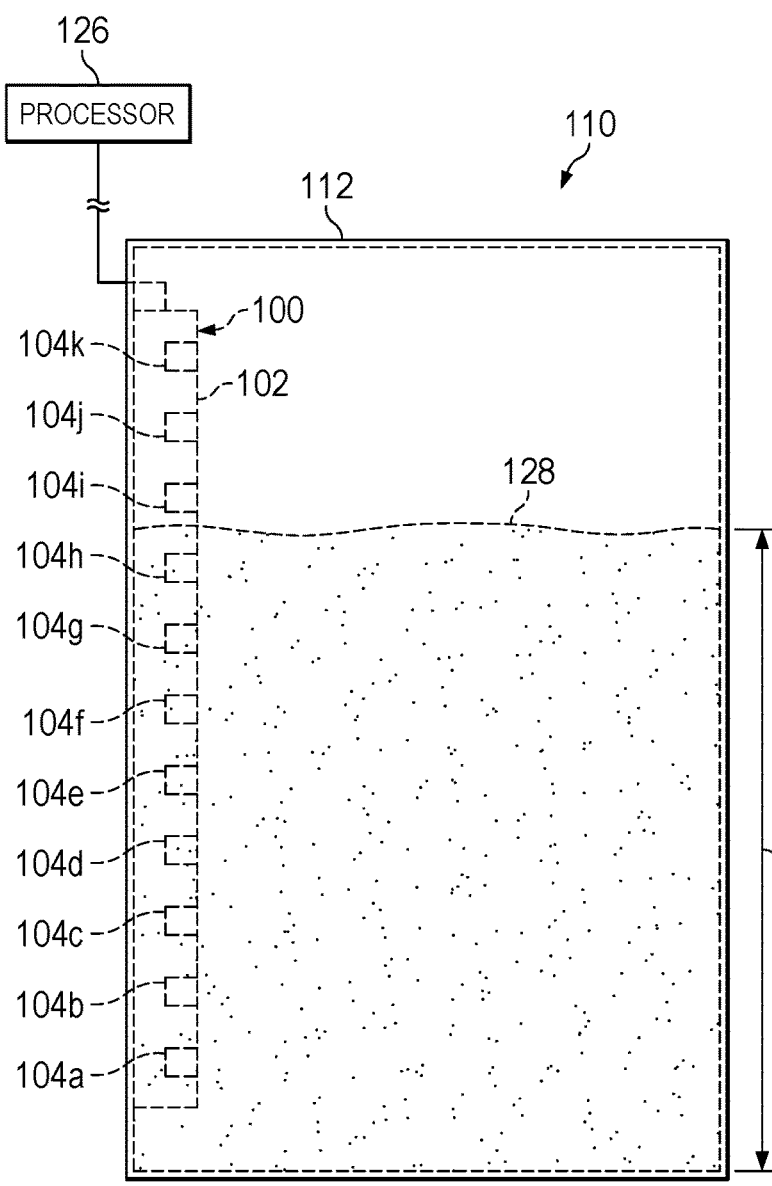
FIGS. 4A-4H are various views of a fluid level sensing system detecting different fluid levels of a fluid container in accordance with embodiments of the present disclosure.
Figure 4B:
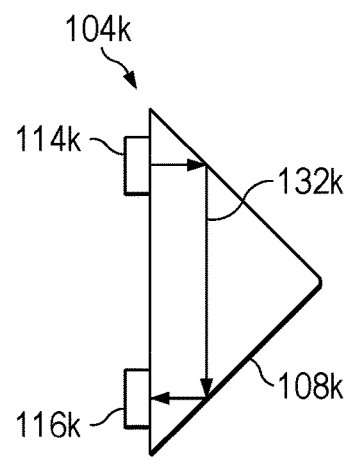
Figure 4C:
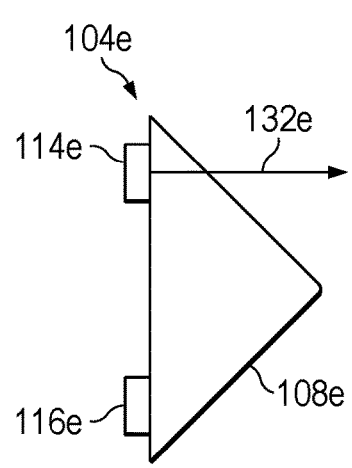
Figure 4D:
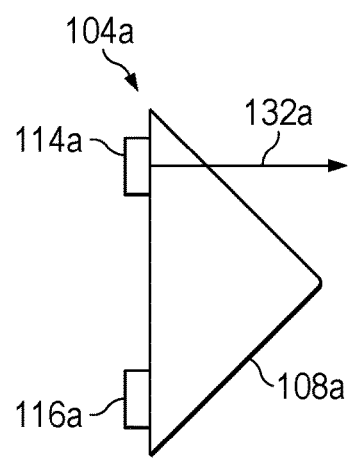
Figure 4E:
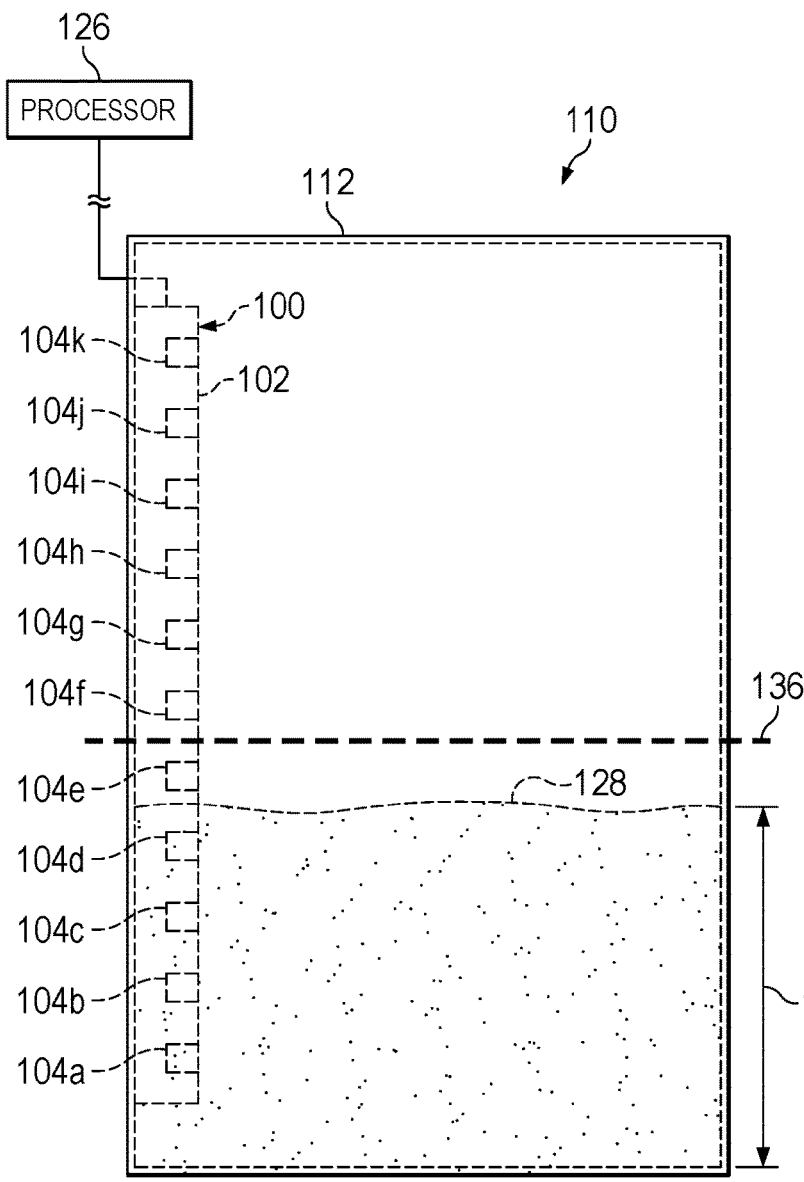
Figure 4F:
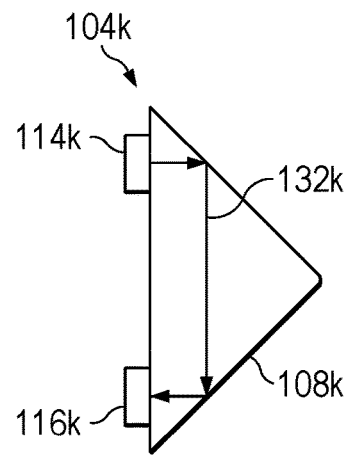
Figure 4G:
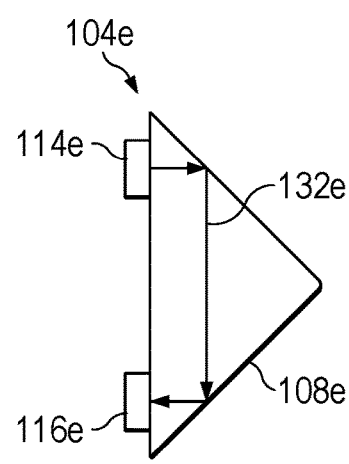
Figure 4H:
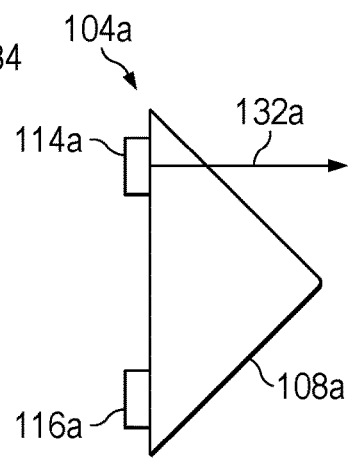

Referring additionally to FIGS. 3A-3B in the drawings, fluid level sensing system 110 includes fluid level sensing array 100 mounted to the inner surface of one of the side walls of fluid container 112 such as a fuel tank or gearbox housing. Mounting strip 102 is mounted vertically to fluid container 112. Fluid sensing nodes 104 are collinear in a vertical arrangement. The fluid sensing node shown in cross-section in FIG. 3B is substantially similar to the other fluid sensing nodes 104 on mounting strip 102 shown in FIG. 3A therefore, for sake of efficiency, certain features will be disclosed only with regard to the fluid sensing node shown in FIG. 3B. One having ordinary skill in the art, however, will fully appreciate an understanding of each of fluid sensing nodes 104 shown in FIG. 3A based upon the disclosure herein of the fluid sensing node shown in FIG. 3B.

Interposed between mounting strip 102 and prism 108 of each fluid sensing node 104 is a photoemitter 114 and a photoreceptor 116. More particularly, photoemitter 114 and photoreceptor 116 are adjacent a mounting strip-facing side 118 of prism 108, and in some embodiments photoemitter 114 and photoreceptor 116 are attached to mounting strip-facing side 118 of prism 108. All photoemitters 114 of fluid sensing nodes 104 are substantially collinear with one another on mounting strip 102 and all photoreceptors 116 are substantially collinear with one another as well. Each fluid sensing node 104 includes a substrate 120 coupled to mounting strip 102 that supports or houses photoemitter 114, photoreceptor 116 and associated wiring thereto such that photoemitter 114 and photoreceptor 116 are interposed between prism 108 and substrate 120. In one non-limiting example, photoemitter 114, photoreceptor 116 and wiring may be embedded in substrate 120 similar to a printed circuit board. In other embodiments, fluid sensing nodes 104 do not include substrates 120, and photoemitter 114 and photoreceptor 116 may be coupled directly to mounting strip 102. As best seen in FIG. 3B, guard rails 106 have a height approximating that of fluid sensing nodes 104 to provide fluid sensing nodes 104 with protection against impacts. In other embodiments, guard rails 106 may be substantially taller or substantially shorter than fluid sensing nodes 104. Mounting strip 102 forms an internal cavity, or channel, 122 through which one or more wires electrically interconnecting fluid sensing nodes 104 may be disposed.

Photoemitter 114 may be one or more light emitting diodes (LED) or any other device capable of emitting light. Photoreceptor 116 may be any device capable of detecting photons, and in some embodiments may transmit a voltage, current or other signal proportional to the amount of light received thereon. The illustrative embodiments utilize the refractive index of the material from which prism 108 is formed to determine whether fluid is covering each fluid sensing node 104. Photoemitter 114 emits light into prism 108, which internally reflects the light onto photoreceptor 116 when fluid sensing node 104 is not covered in fluid. More particularly, when fluid does not cover prism 108, photoreceptor 116 receives greater than a threshold amount of light from photoemitter 114 internally reflected by prism 108, which switches fluid sensing node 104 to the fluid absent state. Conversely, when prism 108 is covered in fluid, the light from photoemitter 114 exits prism 108 and photoreceptor 116 receives less than the threshold amount of light from photoemitter 114, which switches fluid sensing node 104 to the fluid present state. The threshold amount of light that switches fluid sensing node 104 between the fluid absent state and the fluid present state may be any suitable threshold. For example, the threshold amount of light for switching the fluid detection state of fluid sensing node 104 may be close to zero, in which case fluid sensing node 104 switches to the fluid present state when photoreceptor 116 receives no light from photoemitter 114. Higher light thresholds may be set to account for noise or other environmental factors. For example, a higher light threshold may help to prevent fluid sensing node 104 from switching to the fluid absent state due to light sources other than photoemitter 114. The material, refractive index and internal angles 124 of prism 108 may vary to accommodate different fluid types such as oil, water or cleaner. Processor 126 determines the fluid level of fluid container 112 based on the fluid detection states of fluid sensing nodes 104.

Referring additionally to FIGS. 4A-4H in the drawings, fluid 128 in fluid container 112 is shown at two different levels to illustrate the operation of fluid level sensing system 110. Fluid level sensing array 100 is mounted to the side wall of fluid container 112 and includes fluid sensing nodes 104a-104k coupled to mounting strip 102. In FIGS. 4A-4D, fluid 128 in fluid container 112 has fluid level 130 so that fluid 128 covers fluid sensing nodes 104a-104h but does not cover fluid sensing nodes 104i-104k. When the fluid level is above a prism, as in the cases of fluid sensing node 104e in FIG. 4C and fluid sensing node 104a in FIG. 4D, the refractive properties of prisms 108a, 108e in fluid 128 cause light 132a, 132e emitted by photoemitters 114a, 114e to exit prisms 108a, 108e, resulting in an open circuit. Therefore, photoreceptors 116a, 116e of fluid sensing nodes 104a, 104e detect little or no light 132a, 132e placing fluid sensing nodes 104a, 104e in a fluid present state as the detected light is less than the threshold amount of light. Similarly, fluid sensing nodes 104b, 104c, 104d, 104f, 104g, 104h are in a fluid present state. In contrast, fluid sensing nodes 104i-104k are above fluid level 130 and therefore not covered by fluid 128. As represented by fluid sensing node 104k in FIG. 4B, when prism 108k is not covered by fluid 128, light 132k emitted by photoemitter 114k is internally reflected by prism 108k due to the refractive properties of prism 108k unsurrounded by fluid 128, resulting in a closed circuit in which photoreceptor 116k detects light 132k. The amount of light 132k received by photoreceptor 116k exceeds the threshold amount of light that causes fluid sensing node 104k to switch to the fluid absent state. Similarly, fluid sensing nodes 104i, 104j are each in a fluid absent state.

Processor 126 may use different logic routines such as simple comparison logic to determine fluid level 130 of fluid container 112. In some embodiments, because fluid level 130 is proportional to the number of fluid sensing nodes 104a-104h in the fluid present state, processor 126 may determine fluid level 130 based on the number of fluid sensing nodes 104a-104h in the fluid present state. In the example of FIGS. 4A-4D, processor 126 may identify eight fluid sensing nodes 104a-104h in the fluid present state and three fluid sensing nodes 104i-104k in the fluid absent state and utilize these numbers to determine fluid level 130 using, for example, a lookup table. In certain embodiments, each fluid sensing node 104a-104k has a known position spaced at known height intervals along mounting strip 102 and processor 126 uses both the fluid detection states and the known positions of fluid sensing nodes 104a-104k to determine fluid level 130. For example, based on the known positions and fluid detection states of fluid sensing nodes 104a-104k as illustrated in FIGS. 4A-4D, processor 126 may determine that fluid level 130 is between fluid sensing nodes 104h and 104i, and may further calculate the height or volume of fluid 128 in English or metric units.

In FIGS. 4E-4H, the amount of fluid 128 in fluid container 112 has decreased to fluid level 134 due to leakage or other causes. Thus, while fluid sensing node 104a has remained in the fluid present state, with light 132a from photoemitter 114a exiting prism 108a undetected by photoreceptor 116a, and fluid sensing node 104k has remained in the fluid absent state, with prism 108k internally reflecting light 132k from photoemitter 114k to photoreceptor 116k, fluid sensing node 104e has switched to the fluid absent state, with prism 108e internally reflecting light 132e from photoemitter 114e to photoreceptor 116e. Processor 126 detects fluid level 134 based on the same logic used to determine fluid level 130 in FIGS. 4A-4D. In the operational state shown in FIGS. 4E-4H, fluid level 134 has decreased below a safe fluid level threshold 136. In some embodiments, processor 126 may transmit an alert or signal when fluid level 134 falls below safe fluid level threshold 136 to warn of a dangerous condition. In some embodiments, processor 126 determines that fluid level 134 has fallen below safe fluid level threshold 136 in response to fluid sensing node 104e or fluid sensing node 104f switching from the fluid present state to the fluid absent state. Fluid level sensing system 110 is capable of detecting the level of fluid 128 along substantially the entire length of fluid level sensing array 100. In the illustrated embodiment, fluid level sensing array 100 extends almost the entire height of fluid container 112. In other embodiments, however, fluid level sensing array 100 may extend across only a selected height interval of fluid container 112 that is most important to the function of fluid container 112. For example, fluid level sensing array 100 may include only fluid sensing nodes that are adjacent to or straddle safe fluid level threshold 136 such as fluid sensing nodes 104d-104g to ensure that an alert is generated by processor 126 when the fluid level falls to an unsafe or undesired height.

Figure 5:
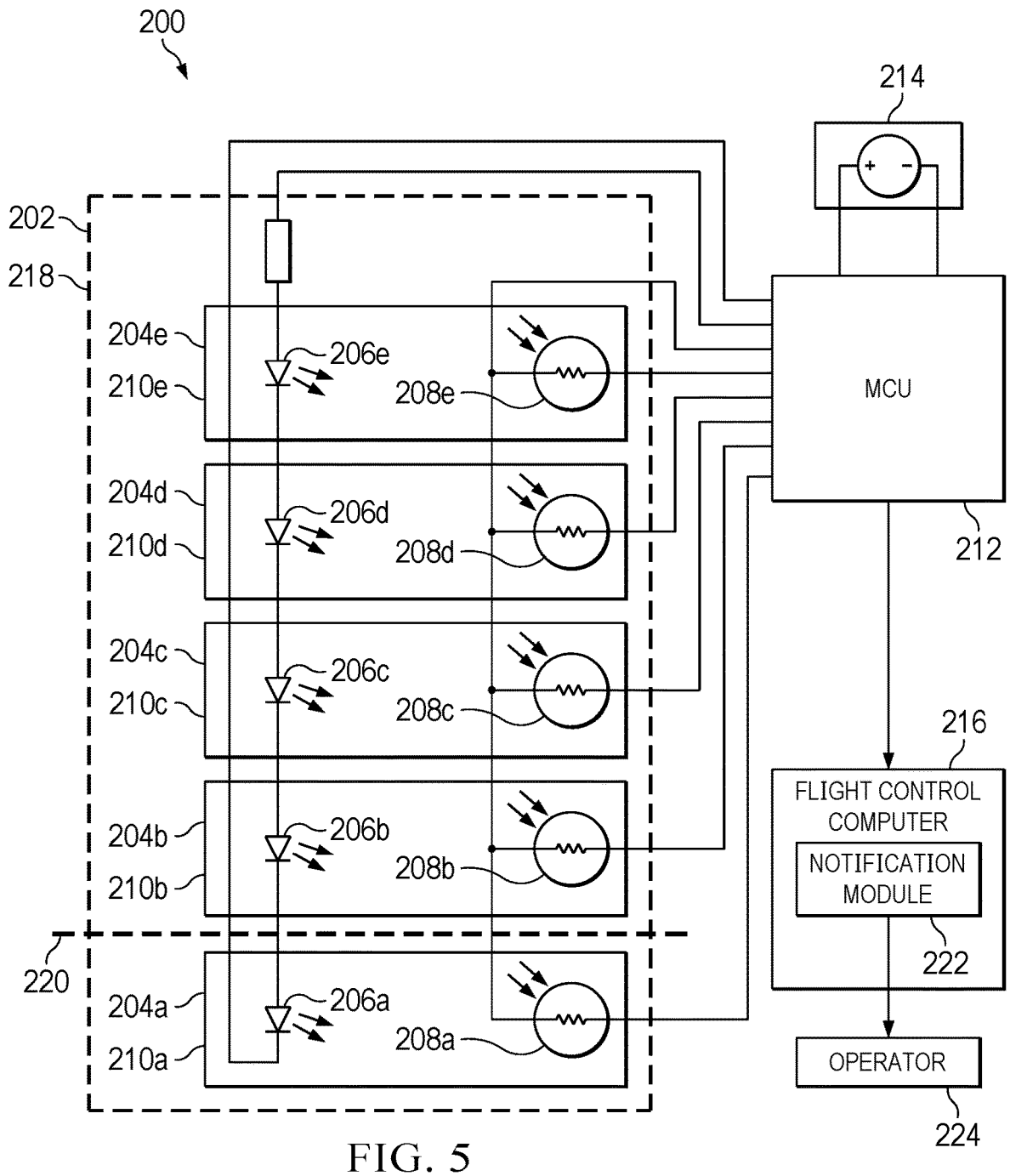
FIG. 5 is a schematic circuit diagram of a fluid level sensing system in accordance with embodiments of the present disclosure.

Referring to FIG. 5 in the drawings, a circuit diagram of a fluid level sensing system is schematically illustrated and generally designated 200. Fluid level sensing system 200 includes fluid level sensing array 202 including fluid sensing nodes 204a-204e. Fluid sensing nodes 204a-204e each include a respective photoemitter 206a-206e and photoreceptor 208a-208e. In the illustrated embodiment, photoemitters 206a-206e are LEDs and photoreceptors 208a-208e are photoresistors such as photocells, light dependent resistors or photoconductive cells. Photoemitters 206a-206e and photoreceptors 208a-208e are each covered by respective prisms 210a-210e. Fluid level sensing system 200 also includes a processor depicted as microcontroller unit 212. A circuit driver depicted as power source 214 provides electrical energy to fluid level sensing array 202 and microcontroller unit 212. In the illustrated embodiment, fluid level sensing system 200 is being used to detect the fluid level of a fluid container on an aircraft and therefore includes flight control computer 216. While microcontroller unit 212 is shown to be separate from flight control computer 216, in other embodiments, flight control computer 216 may include microcontroller unit 212.

Fluid level sensing system 200 has a wiring scheme that partitions the circuit wiring for photoemitters 206a-206e from the wiring for photoreceptors 208a-208e to allow for scalability and wiring simplification. Photoemitters 206a-206e receive power from power source 214 and are wired in series. Photoreceptors 208a-208e, on the other hand, are wired as loops or meshes in series so that microcontroller unit 212 may receive, read and distinguish data from each individual photoreceptor 208a-208e, allowing for the fluid detection state of each fluid sensing node 204a-204e to be individually determined. Meshes for each photoreceptor 208a-208e are individually electrically connected to microcontroller unit 212. In some embodiments, photoreceptors 208a-208e each provide voltage data that is proportional or inversely proportional to the amount of light received by the photoreceptor and microcontroller unit 212 then uses this voltage data to determine the fluid detection state of each fluid sensing node 204a-204e. In some embodiments, the individual meshes or circuits for each photoreceptor 208a-208e may be laid out in orthogonal planes so that mounting strip 218 can be cut to a desired length without severing the wires interconnecting photoreceptors in the usable portion of fluid level sensing array 202. For example, mounting strip 218 may be severed at cut line 220, thereby removing fluid sensing node 204a from fluid level sensing array 202 and shortening fluid level sensing array 202 to a desired length. In addition, the wires interconnecting fluid sensing nodes 204a-204e may be located in an internal cavity or channel formed by mounting strip 218 such as internal cavity 122 in FIG. 3B to allow for convenient or organized access to the wires therein.

Flight control computer 216 includes a notification module 222 that sends data pertaining to the fluid level detected by fluid level sensing array 202 to operator 224 or elsewhere. Operator 224 may be an operator of the aircraft such as an onboard pilot or ground control. Notification module 222 may send different signals or notifications regarding fluid level depending on the embodiment. For example, notification module 222 may send the fluid level to a gauge such as a fuel gauge or oil level gauge that allows operator 224 to monitor the fluid level across a range of values from full to empty. In other examples, notification module 222 may send an alert such as a visual or audible alert to operator 224 in response to the fluid level being less than a safe fluid level threshold such as safe fluid level threshold 136 in FIG. 4E.

Figure 6A:
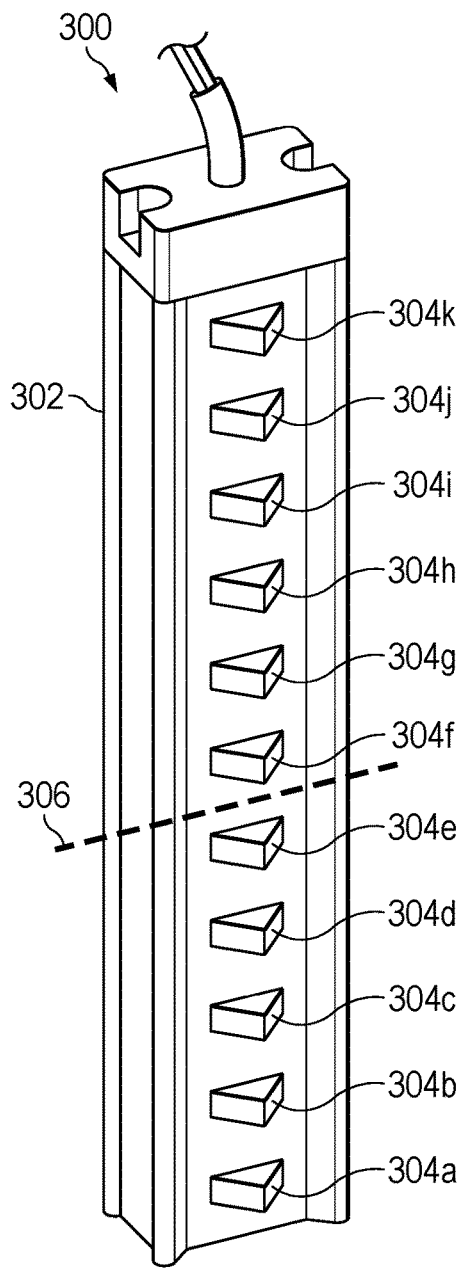
FIGS. 6A-6B are isometric views of a fluid level sensing array severed at different lengths in accordance with embodiments of the present disclosure.
Figure 6B:
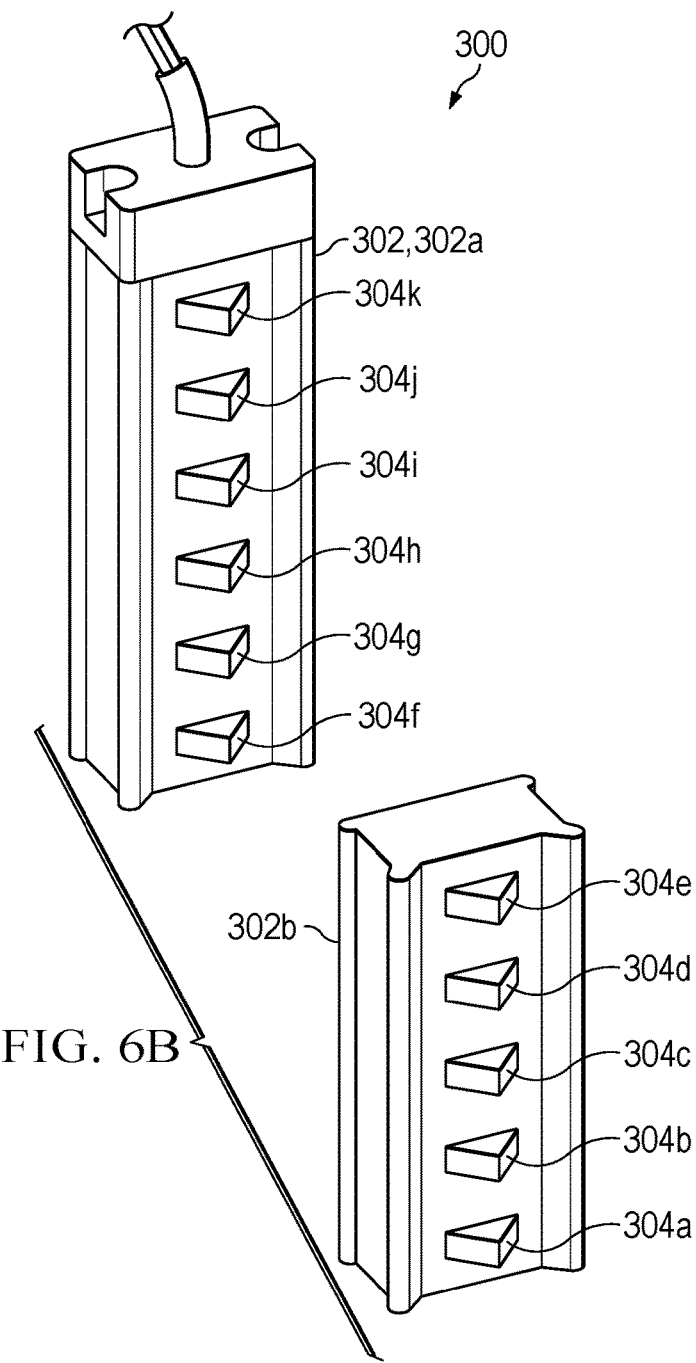

Referring to FIG. 6 in the drawings, a fluid level sensing array is schematically illustrated and generally designated 300. Fluid level sensing array 300 includes mounting strip 302 to which fluid sensing nodes 304a-304k are coupled. Mounting strip 302 is severable at any customizable length to fit any desired fluid container. For example, mounting strip 302 may be trimmed to length at cut line 306 to split mounting strip 302 into a usable portion 302a and a discardable portion 302b. Usable portion 302a of mounting strip 302 includes fluid sensing nodes 304f-304k and discardable portion 302b of mounting strip 302 includes fluid sensing nodes 304a-304e. Any loose wiring at the bottom of usable portion 302a of mounting strip 302 is connected or repositioned to complete or clean the electrical connections to the photoemitters and photoreceptors of fluid sensing nodes 304f-304k. After being severed, usable portion 302a of mounting strip 302 may be fitted to any container that holds fluid such as a gearbox, fuel tank or water tank. Thus, the illustrative embodiments described herein employ a scalable modular architecture that avoids the need to develop or manufacture unique sensors for each fluid container. Using the illustrative embodiments, custom calibration or precise foreknowledge of the typical fluid levels in a fluid container are not required during or after installation. Calibration of the fluid level sensing arrays of the illustrative embodiments may be performed regardless of the vertical spatial placement of the fluid level sensing arrays along the wall of a fluid container. For example, a fluid level sensing array may be installed in a fluid container and a known quantity of fluid may be added to calibrate the system. Adding specific fluid amounts for calibration is often more accurate and practical for complex shaped systems. The fluid level sensing arrays of the illustrative embodiments also allow for longer sensing ranges and may be used to measure long term seal leak rates.

Figure 7A:
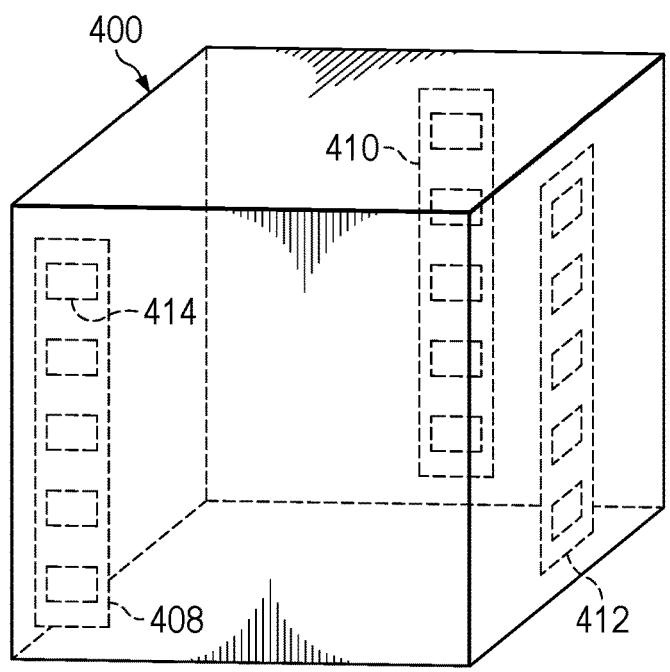
FIGS. 7A-7D are various views of a fluid level sensing system employing multiple fluid level sensing arrays to detect a fluid level plane of a fluid container at different attitudes in accordance with embodiments of the present disclosure.
Figure 7B:
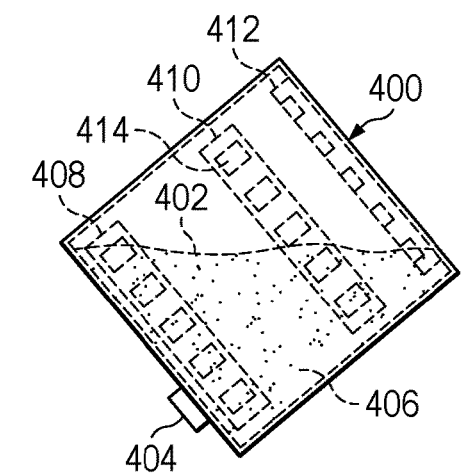
Figure 7C:
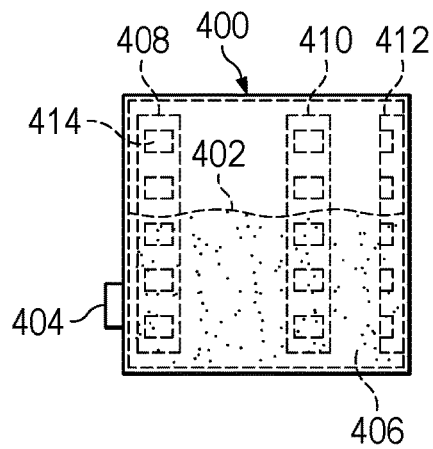
Figure 7D:
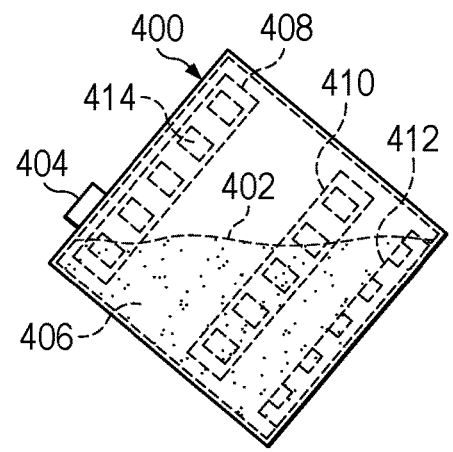

Referring to FIGS. 7A-7D in the drawings, a fluid container for an aircraft is schematically illustrated and generally designated 400. Previous fluid level sensing systems have been unable to detect fluid levels during uncoordinated aircraft maneuvers. FIGS. 7B-7D show fluid container 400 at various aircraft attitudes, which cause fluid level plane 402 to fluctuate relative to fluid container 400. Monitoring fluid level plane 402 may be helpful to an operator of the aircraft for several reasons. For example, a proper fluid level plane 402 ensures that gears within a gearbox are adequately covered. An improper fluid level plane 402, however, may flood a pump connected to the gearbox or cause a pump inlet 404 to be uncovered by fluid as shown in FIG. 7D, which can lead to cavitation and pump damage.

FIGS. 7A-7D illustrate a tri-sensor implementation of the illustrative embodiments that determines fluid level plane 402 at any aircraft attitude for maneuvers within the design range of the aircraft. This implementation also determines the height of fluid 406 when the aircraft is at an attitude that is different from the calibration ground plane. Fluid container 400 includes three fluid level sensing arrays 408, 410, 412, each coupled to a different side wall of fluid container 400, to determine three different fluid levels of fluid 406 and thereby detect fluid level plane 402 using these three data points. In other embodiments, two, four or more fluid level sensing arrays may be coupled to the side walls of fluid container 400 to determine a corresponding number of plane points for fluid level plane 402. A processor associated with the aircraft determines fluid level plane 402 of fluid 406 in fluid container 400 based on the fluid detection states of fluid sensing nodes 414 of fluid level sensing arrays 408, 410, 412. The processor also determines fluid level plane 402 of fluid 406 in fluid container 400 using the positions of fluid level sensing arrays 408, 410, 412 relative to fluid container 400 as well as the positions of fluid sensing nodes 414 on their respective fluid level sensing arrays 408, 410, 412. The readings from fluid level sensing arrays 408, 410, 412 establish fluid level plane 402, which may then be used to calculate fluid volume at any aircraft attitude using, for example, simple calibration or a lookup table. When used in concert with baffles and/or suitable data conditioning, fluid level sensing arrays 408, 410, 412 may help to provide accurate warnings to operators to avoid lubrication pump cavitation. Fluid level sensing arrays 408, 410, 412 provide an accurate and reliable warning and notification system that allows for greater maneuverability of the aircraft while avoiding low pressure warning events.

Figure 8A:
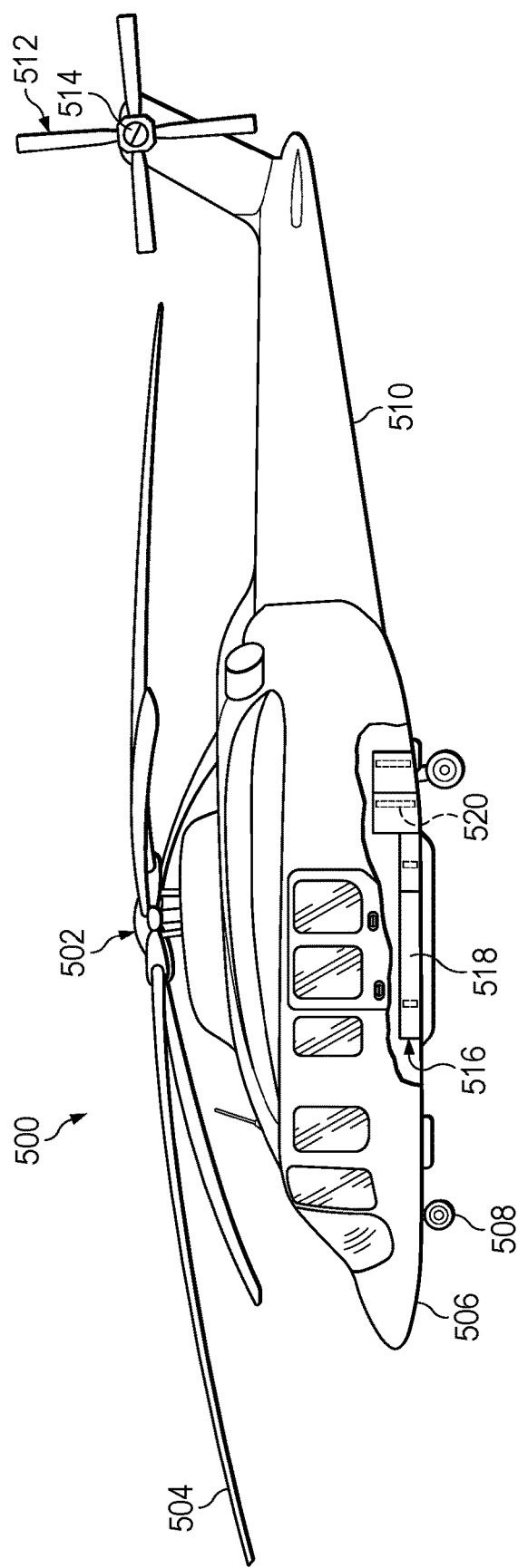
FIGS. 8A-8B are schematic illustrations of a rotorcraft implementing a fluid level sensing system for a fuel tank in accordance with embodiments of the present disclosure.
Figure 8B:
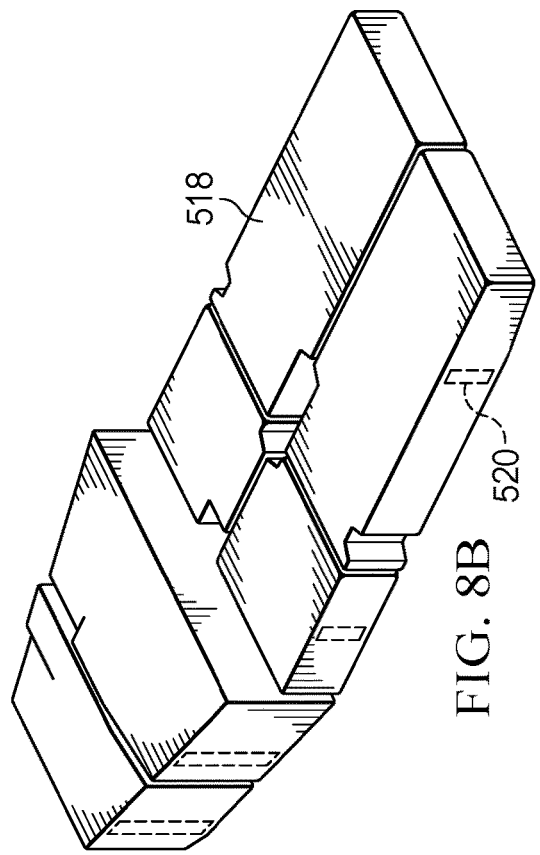

Referring to FIGS. 8A-8B the drawings, a rotorcraft depicted as a helicopter is schematically illustrated and generally designated 500. Rotorcraft 500 has rotor hub assembly 502, which includes a plurality of rotor blade assemblies 504. Rotor hub assembly 502 is rotatable relative to fuselage 506 of rotorcraft 500. The pitch of rotor blade assemblies 504 can be collectively and/or cyclically manipulated to selectively control direction, thrust and lift of rotorcraft 500. A landing gear system 508 provides ground support for rotorcraft 500. A tailboom 510 extends from fuselage 506. A tail rotor 512 includes a tail rotor hub assembly 514 that is rotatably coupled to an aft portion of tailboom 510. Rotorcraft 500 has a fuel system 516 located in a lower portion of fuselage 506. Fuel system 516 contains one or more fuel cells 518 such as fuel tanks, each of which contain fuel. The fuel contained in fuel cells 518 is used as an energy source to power the various systems of rotorcraft 500, such as rotor hub assembly 502 and tail rotor hub assembly 514. Rotorcraft 500 has a fluid level sensing system as described in the illustrative embodiments including fluid level sensing arrays 520. Each fluid level sensing array 520 is coupled to the inner surface of a side wall of a respective fuel cell 518. Fluid level sensing arrays 520 collectively detect the fuel level of fuel cells 518. Multiple fluid level sensing arrays may be employed for each fuel cell 518 to allow for the detection of the fuel level plane in each fuel cell 518. Thus, the illustrative embodiments are widely applicable to many different fluids, fluid containers, vehicles and devices such as fuel, oil, lubrication fluid, cleaner or water in both airborne or ground-based fluid containers.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A fluid level sensing system comprising:
a mounting strip defining an internal cavity and an outer surface;
a plurality of fluid sensing nodes coupled to the mounting strip in a collinear arrangement, each fluid sensing node switchable between a plurality of fluid detection states including a fluid present state and a fluid absent state, each fluid sensing node comprising:
a prism;
a photoemitter coupled to the outer surface of the mounting strip such that the photoemitter is interposed between the prism and the mounting strip, the photoemitter configured to emit light into the prism; and
a photoreceptor coupled to the outer surface of the mounting strip such that the photoreceptor is interposed between the prism and the mounting strip, the photoreceptor receiving greater than a threshold amount of light from the photoemitter internally reflected by the prism in the absence of fluid around the prism to switch the fluid sensing node to the fluid absent state, the photoreceptor receiving less than the threshold amount of light from the photoemitter when the prism is covered in fluid to switch the fluid sensing node to the fluid present state; and
a processor to determine a fluid level based on the fluid detection states of the fluid sensing nodes;
wherein, the photoemitter and the photoreceptor are located outside the internal cavity of the mounting strip; and
wherein, the prism is coupled to the outer surface of the mounting strip via the photoemitter and the photoreceptor.

2. The fluid level sensing system as recited in claim 1 wherein the mounting strip comprises one or more guard rails to protect the fluid sensing nodes.

3. The fluid level sensing system as recited in claim 1 wherein the mounting strip is configured to be severed at a customizable length adapted for a fluid container.

4. The fluid level sensing system as recited in claim 1 further comprising one or more wires in the internal cavity of the mounting strip electrically interconnecting the fluid sensing nodes.

5. The fluid level sensing system as recited in claim 1 wherein the fluid sensing nodes are uniformly spaced along the mounting strip.

6. The fluid level sensing system as recited in claim 1 wherein each fluid sensing node has a position along the mounting strip, the processor determining the fluid level based on the fluid detection states and the positions of the fluid sensing nodes.

7. The fluid level sensing system as recited in claim 1 wherein each of the prisms is a polymeric prism.

8. The fluid level sensing system as recited in claim 1 wherein the photoemitters of the fluid sensing nodes are wired in series.

9. The fluid level sensing system as recited in claim 1 wherein, for each of the fluid sensing nodes, the photoreceptor receives zero light from the photoemitter when the prism is covered in fluid to switch the fluid sensing node to the fluid present state.

10. The fluid level sensing system as recited in claim 1 wherein the fluid level is proportional to a number of fluid sensing nodes in the fluid present state.

11. The fluid level sensing system as recited in claim 1 further comprising a notification module configured to send fluid level data relating to the fluid level.

12. The fluid level sensing system as recited in claim 11 wherein the notification module sends an alert in response to the fluid level being less than a safe fluid level threshold.

13. The fluid level sensing system as recited in claim 1 wherein the photoemitter and the photoreceptor are coupled to a mounting strip-facing side of the prism.

14. The fluid level sensing system as recited in claim 1 wherein the mounting strip comprises a monolithic mounting strip having a front side, a rear side and lateral sides defining the internal cavity, the outer surface comprising the outer surface of the front side of the mounting strip.

15. An aircraft comprising:
a fuselage;
a fluid container having one or more side walls, the fluid container configured to hold a fluid;
a fluid level sensing array comprising:
a mounting strip coupled to an inner surface of the one or more side walls of the fluid container, the mounting strip defining an internal cavity and an outer surface; and
a plurality of fluid sensing nodes coupled to the mounting strip in a collinear arrangement, each fluid sensing node switchable between a plurality of fluid detection states including a fluid present state and a fluid absent state, each fluid sensing node comprising:
a prism;
a photoemitter coupled to the outer surface of the mounting strip such that the photoemitter is interposed between the prism and the mounting strip, the photoemitter configured to emit light into the prism; and
a photoreceptor coupled to the outer surface of the mounting strip such that the photoreceptor is interposed between the prism and the mounting strip, the photoreceptor receiving greater than a threshold amount of light from the photoemitter internally reflected by the prism in the absence of fluid around the prism to switch the fluid sensing node to the fluid absent state, the photoreceptor receiving less than the threshold amount of light from the photoemitter when the prism is covered in fluid to switch the fluid sensing node to the fluid present state; and
a processor to determine a fluid level of the fluid container based on the fluid detection states of the fluid sensing nodes;
wherein, the photoemitter and the photoreceptor are located outside the internal cavity of the mounting strip; and
wherein, the prism is coupled to the outer surface of the mounting strip via the photoemitter and the photoreceptor.

16. The aircraft as recited in claim 15 wherein the fluid container comprises a gearbox housing for a gearbox and the fluid comprises a lubricating fluid.

17. The aircraft as recited in claim 16 wherein the gearbox comprises a main rotor gearbox disposed in the fuselage.

18. The aircraft as recited in claim 15 wherein the fluid container comprises a fuel tank and the fluid comprises fuel.

19. The aircraft as recited in claim 15 wherein the fluid level sensing array comprises a plurality of fluid level sensing arrays coupled to the one or more side walls of the fluid container; and
wherein, the processor determines a fluid level plane of the fluid in the fluid container based on the fluid detection states of the fluid sensing nodes of the plurality of fluid level sensing arrays.

20. The aircraft as recited in claim 19 wherein each fluid level sensing array occupies a position within the fluid container and the fluid sensing nodes each have a position along a respective mounting strip; and
wherein, the processor determines the fluid level plane based on the fluid detection states of the fluid sensing nodes of the plurality of fluid level sensing arrays, the positions of the fluid level sensing arrays and the positions of the fluid sensing nodes.

* * * * *